(No Model.) 3 Sheets—Sheet 1.

R. I. SKILES.
THREE ROW COMBINATION CORN PLANTER AND ROW CHECKER.

No. 357,047. Patented Feb. 1, 1887.

WITNESSES: Howard S. Bailey, Charles E. Skiles

INVENTOR: Robert I. Skiles (No Model.)   3 Sheets—Sheet 2.

R. I. SKILES.

THREE ROW COMBINATION CORN PLANTER AND ROW CHECKER.

No. 357,047. Patented Feb. 1, 1887.

WITNESSES:
Howard S. Bailey
Charles E. Skiles

INVENTOR
Robert I. Skiles

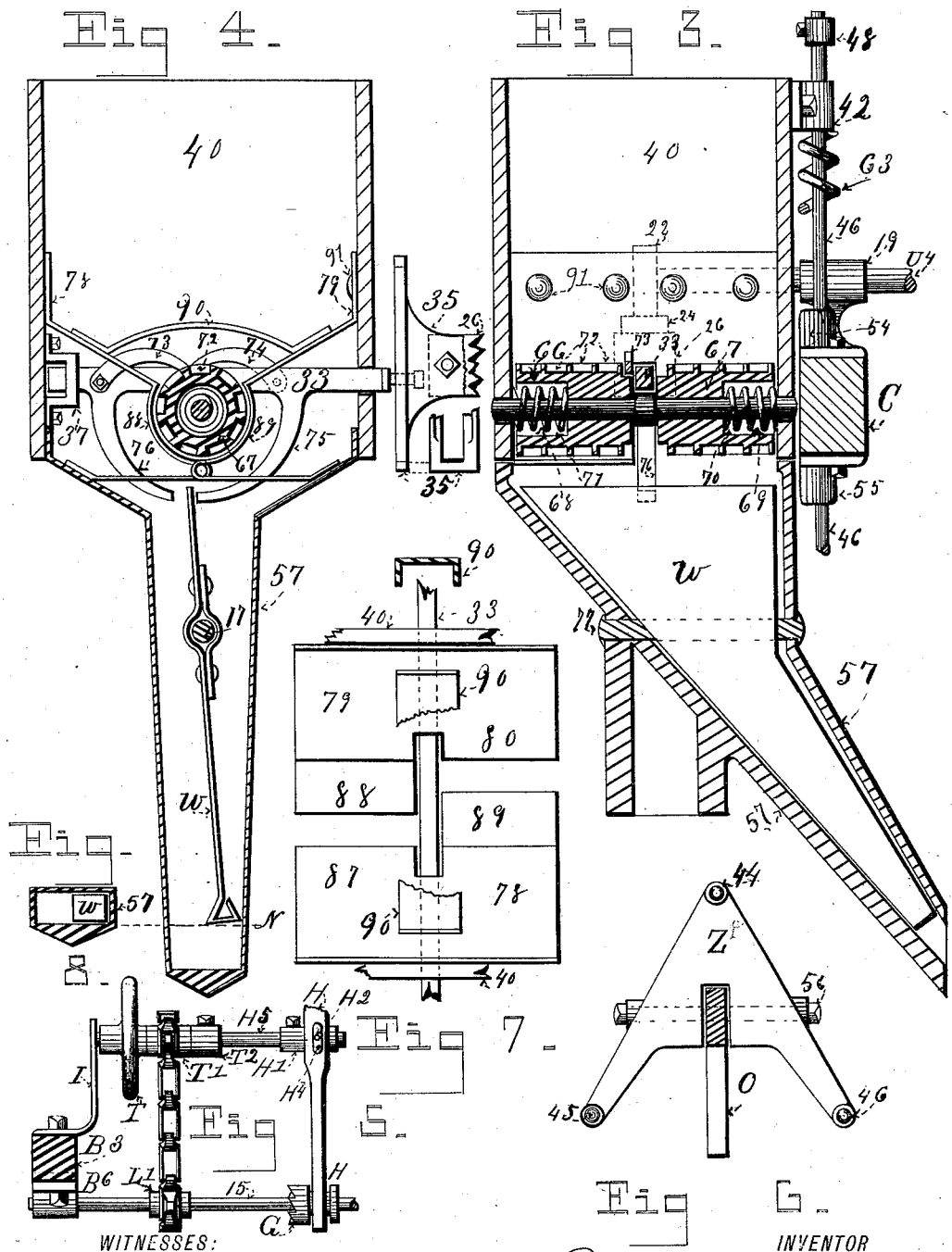

UNITED STATES PATENT OFFICE.

ROBERT IRONS SKILES, OF DENVER, COLORADO, ASSIGNOR TO THE SKILES CORN PLANTER COMPANY, OF SAME PLACE.

THREE-ROW COMBINATION CORN-PLANTER AND ROW-CHECKER.

SPECIFICATION forming part of Letters Patent No. 357,047, dated February 1, 1887.

Application filed October 29, 1886. Serial No. 217,505. (No model.)

*To all whom it may concern:*

Be it known that I, ROBERT IRONS SKILES, a citizen of the United States, residing at Denver, in the county of Arapahoe and State of Colorado, have invented certain new and useful Improvements in Three-Row Combination Corn-Planters and Row-Checkers; and I do hereby declare the following to be a full, clear, and exact description of the same, reference being had to the accompanying drawings, wherein—

Figure 1:
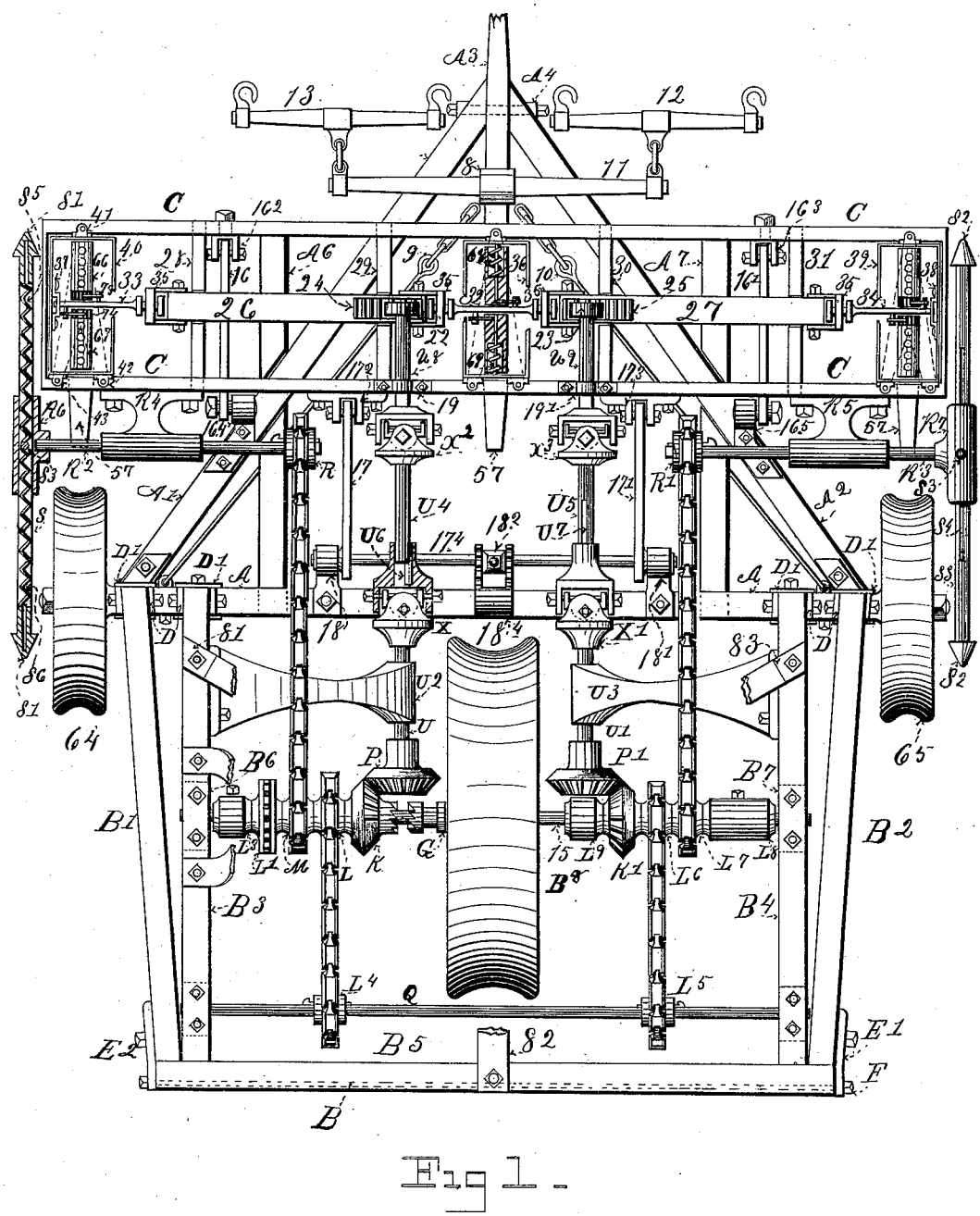
Figure 2:
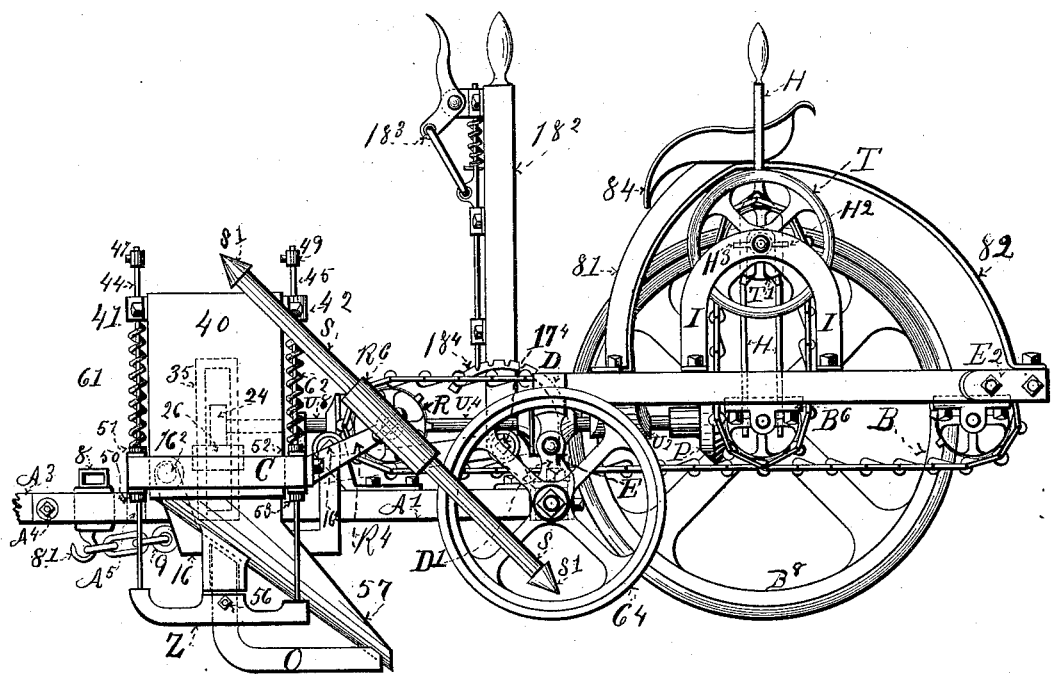

Figure 1 is a plan view of a three-row planter and row-checker embodying my invention, the driver's seat and the mechanism for adjusting the row-checker being broken away to show the parts beneath. Fig. 2 is a side elevation of the same, the driver's seat and row-checker adjusting mechanisms being in place. Fig. 3 is a vertical longitudinal section of the feed-box, dropping mechanism, and its adjuncts. Fig. 4 is a similar section of the feed-box and dropping mechanism at right angles to Fig. 3. Fig. 5 is an elevation of the hand-wheel and mechanism for adjusting the row-checker and of the shipping-lever for starting and stopping the planting mechanism, looking from the rear of the machine. Fig. 6 is a plan view of the shoe which is placed beneath each feed-box and of the knife attached thereto for cutting roots, &c. Fig. 7 is a detached top or plan view of the guides which partially inclose the feed-cylinders of the feed-box and retain the grain in the cylinders until the proper moment for its escape therefrom. Fig. 8 is a transverse section of the seed conductor or dropper on the line N N, showing the position of the discharge-regulator or flirt-valve W.

Like letters and figures refer to like parts wherever they occur.

My invention relates to that class of planters by means of which the seeds are deposited in the ground at regular intervals, and are covered in various ways by the planter as it progresses.

In this class of planters it is desirable that the machine move in a straight line, and that in moving to and fro across a field the rows planted should be uniform and at equal distances apart. It is also desirable that the planter be capable of planting the seed at uniform depth notwithstanding any inequalities of the surface or ground over which the machine passes.

The objects of my invention are, first, to provide means for automatically making a row of checks in the ground as the planter crosses the field, which checks can be used as guides when returning; second, to provide means for planting the seed opposite to the checks made, so as to insure straight rows both ways and at right angles; third, to provide means therefor and so to combine the feed-boxes that three (3) rows may be simultaneously planted; fourth, to provide means whereby either one, two, three, or four seeds may be dropped at a time, as desired; fifth, to provide a planter which will plant at any desired depth; sixth, to provide means whereby the feed-boxes are rendered independent each of the others, so that the seed from each will be planted at a given and uniform depth, notwithstanding any inequalities of the ground, depressions, sharp ditches, dead furrows, &c.

In order to facilitate the subsequent description of the devices and their operation, I will first broadly outline the constructions which embody the main features of the invention.

There is, first, a main axle, A, with the usual wheels and a rigid frame attached in front thereof, and which carries the tongue; secondly, there is a transverse vertically-adjustable frame for the seed-boxes, said frame carried by the rigid frame, and on this second frame the seed-boxes are mounted so as to each have its independent vertical movement; thirdly, there is a rear or floating frame pivoted to the axle and which carries the power-shaft, and on which is arranged the power or driving wheel; fourthly, there are two check-row markers journaled on the vertically-adjustable seed-box frame and set to track with the droppers; fifthly, there are two independent sets of sprocket-wheels and link-belting for actuating the check-row markers and two independent sets of gear-wheels and extensible tumbler-shafts with universal joints for actuating the feed-devices, all of which gearing is driven from the single power-shaft of the rear floating frame; sixthly, there is an independent mechanism for adjusting or setting the check-row marker in stopping, starting, and turning; seventhly, there is a hand-lever and rack and a series of links or levers for adjusting the vertically-movable frame which carries the seed-boxes; and, finally, there is a loose or sliding casting on the tongue, which casting receives the double-tree and is connected by chains and rods to the main axle near the shoulders, so as to bring the draft of the team entirely on the axle.

I will now proceed to describe more specifically the mechanism preferred, so that others skilled in the art to which the invention appertains may apply the same.

In the drawings, A indicates the main axle, provided with the wheels 64 65, which have a grooved or concave tread to act as seed-coverers. To the main axle A are mortised or tenoned the two conveying-braces A' A², which meet and are secured to the tongue A³ by a bolt or bolts, A⁴. On either side of the tongue A³ are longitudinal braces A⁶ and A⁷, which extend forward from the axle A, and are connected by a transverse brace just back of the double-tree, as indicated by dotted line A⁵, left-hand, Fig. 2. To this transverse brace A⁵ the tongue A³ is also mortised. The braces A', A², A⁵, A⁶, and A⁷, with the axle A, constitute the rigid frame which supports the vertically-adjustable seed-box frame.

Loosely fitted on the tongue A³, so as to slide thereon, is a casting, 8, having on its upper surface a loop or box for the double-tree 11, and on its under side a hook, 8', for the attachment of chains and rods 9 and 10, which extend divergently thence and are secured to the axle A, toward the shoulders thereof, by which means the rigid frame is relieved of strain and the draft is brought directly on the axle 12 and 13 indicate the usual whiffletrees.

To the rear of the axle is the pivoted or floating frame, wherein is journaled the driving-shaft and the power-wheel. This frame is composed of the timbers B B' B² B³ B⁴, connected with each other by castings E' E and bolts F, or otherwise suitably secured, and pivoted on the main axle A by means of hinges D D', (see Figs. 1 and 2,) adapted to embrace or receive the inner ends of the timbers B' B² B³ B⁴, and also to clasp the main axle A, whereby a strong and effective hinge-connection for the floating frame is secured.

E (see Fig. 2) indicates the pin or pintle of the frame, which is directly over the main axle A. The object of this floating frame is to allow the large driving-wheel B⁸ to rise and fall on uneven ground independently of the axle-wheels. It also relieves the axle and the driving-gear of severe twisting strains.

Bolted to the under sides of the frame pieces or timbers B³ B⁴ are journal-boxes B⁶ and B⁷ (see Figs. 1 and 2) for the driving-shaft 15, to which shaft is secured the power or large wheel B⁸, so as to cause the rotation of the shaft 15 with the wheel B⁸. This wheel is also grooved or has a concave tread to serve as a covering-wheel.

Secured on the shaft by a feather or spline and key-seat, so as to slide longitudinally thereon, but rotate therewith, is a clutch, G, with suitable groove for the forked shipping-lever H, (see Figs. 1 and 5,) and arranged loosely on said shaft are two sets of rigidly-connected bevel gear and sprocket wheels—the left-hand set, composed of a bevel-gear, K, sprocket-wheel L, sprocket-wheel M, and sprocket-wheel L', in the order named, and the right-hand set, composed of a bevel-wheel, K', a sprocket-wheel, L⁶, and a sprocket-wheel, L⁷. These sets of gear are prevented from moving endwise on the shaft by means of collars L³ and L⁸, which are secured to the shaft 15 by set-screws.

The bevel-wheels K and K' have each a limited number of teeth, (so as to drive only part of the time,) and the teeth are diametrically opposite each other on the different bevel-wheels, the purpose of which will hereinafter appear. The bevel-gear K has a clutch-section on its hub, to engage with the sliding clutch G and cause the left-hand set, K L M L', of gear to revolve with the shaft.

Journaled in bearings on the rear floating frame, back of the main or driving shaft 15, is a second shaft, Q, provided with sprocket-wheels L⁴ and L⁵, keyed thereto so as to revolve therewith, and from the sprocket-wheel L of shaft 15 a link-belt extends to the sprocket-wheel L⁴ of shaft Q, while a second link-belt extends from sprocket-wheel L⁵ of shaft Q to sprocket-wheel L⁶ on the driving-shaft 15. Consequently, when the left-hand set of gearing, K L, &c., is clutched to and moves with the driving-shaft 15, the power is transmitted by link-belt to sprocket-wheel L⁴ and revolves shaft Q, which in turn, by means of sprocket-wheel L⁵ and link-belt, communicates the power to sprocket-wheel L⁶ on shaft 15, and as the right-hand set of gearing, K', L⁶, and L⁷, is loose on shaft 15 (though rigidly connected to each other) causes said gear-wheels to revolve.

Before describing the connections of the driving mechanism with the feed devices and check-rower it will be necessary to describe the vertically-adjustable frame C, which carries the seed-boxes, and its adjuncts. C indicates the feed-box frame, which has the form of a right-angled parallelogram, strengthened by braces 28, 29, 30, and 31, which are mortised, and serve as guides for reciprocating rods 26 and 27, which actuate the feed mechanism of the seed-boxes. This frame C is supported by or rests transversely on the front or rigid frame, A' A² A³ A⁴, &c., and is controlled by four levers, 16, 16', 17, and 17', of which 16 and 16' are bent sufficiently to clear the mechanism in the center of the feed-box frame C, (see Fig. 2,) and are pivoted to the front bar of said frame, as at 16² and 16³, and to the rigid frame A' A², &c., by the opposite ends of the levers 16 16', as at 16⁴ and 16⁵. The second set of levers, 17 and 17', are pivoted to the rear bar of the feed-box frame, as at 17² and $17^3$, and have their opposite ends rigidly connected to a square rod, $17^4$, which passes through the levers, said rod $17^4$ being journaled in boxes 18 18', which are attached to and project slightly in advance of main axle A.

Secured to the rod $17^4$ is an actuating-lever, $18^2$, (see Fig, 2,) with a spring-bolt $18^3$, or its equivalent, and a notched circular casting or rack, $18^4$, which is secured to the axle A, and between the arms of which rack $18^4$ the lever $18^2$ operates. (See plan view, Fig. 1.) This feed-box frame C carries the feed-boxes and their connections and also the bearings $R^4$ $R^5$ of the row-checker shaft. Consequently when said frame is raised or lowered by the mechanism just described, the entire planting mechanism is raised or lowered with it clear of the ground or to any adjustment for the required depth of planting.

I will next describe the construction of the feed-boxes and the check-rowers, as well as their arrangement on this vertically-adjustable frame C.

The feed-boxes, which are three in number—36, (the center box,) 39, (the right-hand box,) and 40 (the left-hand box)—are placed in line with the two main wheels 64 65 and the central or power wheel, $B^8$, which act as coverers. Said feed-boxes are each provided with three eyes or boxes, 41, 42, and 43, (see left-hand Figs. 1 and 2,) and secured to the frame C, in line therewith, are for each feed-box two sets of three other eyes or boxes each, viz., 50, 51, 52, 53, 54, and 55. (See Figs. 2 and 3.) Passing through the said boxes of both feed-box and frame C are three rods, 44, 45, and 46, which rods are encircled between the boxes of the feed-box and frame by spiral springs 61, 62, and 63, sufficiently strong to substantially sustain the weight imposed on them, and which, while they yieldingly support the feed-boxes each independently of the other, allow them to accommodate themselves to inequalities of the ground, dead furrows, &c.

On the upper ends of the rods 44, 45, and 46 are collars 47, 48, and 49, (see Fig. 2,) secured by set-screws, which prevent the displacement of the feed-boxes, &c.

To the lower ends of said rods 44, 45, and 46, (see Figs. 2 and 6,) where they extend below the frame C, is attached the shoe Z. Pivoted or otherwise secured thereto by a bolt, 56, is a knife, O, the upper end of which extends into a recess (see Figs. 2 and 3) formed in the bottom of the dropper. This knife O not only cuts the small roots or runners which would tear the corn from the ground at the first plowing, but also serves to clear the track for the dropper 57.

Each of the feed-boxes 36, 39, and 40, (see Figs. 3 and 4,) contains two cylinders, 66 and 67, arranged loosely and in axial line on a single shaft having an enlarged central portion or collar against which the ends of the said cylinders are forced by spiral or equivalent springs 68 and 69, contained in concealed cavities 70 and 71 in the ends of the cylinders.

Each cylinder is provided with rows of holes 72, dividing its circumference evenly, each hole of a diameter and depth sufficient to contain but one kernel of corn, (or the amount of other seed desired,) and each cylinder is also provided at its inner end (next to the collar on the shaft) with ratchet-teeth corresponding in number and position with the number and position of the rows of holes.

The ratchet-teeth in the two cylinders point in opposite directions, for purposes which will hereinafter appear. By means of these ratchet-teeth and the pawl-rods 33, &c., pawls 73 and 74, the cylinders are alternately rotated in reverse direction to cause the feed from the hopper 40 to fall into the spout or dropper 57.

Pivoted in the spout or dropper 57, as at 77, is a flirt-valve or regulator, W, the lower end of which controls the outlet of the spout or dropper 57, while its upper end is actuated by two tappet-fingers, 75 and 76, in the sliding pawl-rod 33.

It will be noticed that as the pawl-rod 33 slides in one direction it revolves one of the cylinders by pawl 73, so as to discharge into spout or dropper 57 one lot of kernels, and at the same time actuates or flirts the regulator W by means of finger 76, then on the reverse movement it revolves the other by means of pawl 74, and flirts or moves the regulator W in the opposite direction by means of finger 75. This regulator is made of sheet iron, and operates to catch the corn as it drops from one cylinder and hold it until the check-rowers touch the ground.

Riveted, as at 91, to the opposite sides of the feed-boxes are two sheet-iron aprons or guides, 78 and 79, (see Figs. 4 and 7,) which extend at an angle down to the cylinders on either side, so as to expose three rows of holes to the corn in the box. One-half of each of these guides, as at 80 and 87, Fig. 7, extend only to the cylinders, while the other half of each, as at 88 and 89, are carried around concentric with the cylinders and a trifle beyond their centers. A narrow shield, 90, (see Figs. 4 and 7,) may be used to protect the pawl-rod and pawls 73 74.

The number of grains of corn delivered by the cylinder can be regulated by plugging the holes to reduce their number. By having separate cylinders with different pockets, interchangeable with those shown in the drawings, any kind of seed may be planted. The back edge of the lower end of the spout or dropper 57 forms the path or groove in the ground into which the corn or grain is dropped.

I will next describe the row-checkers.

Secured to the feed-box frame C (see Fig. 1) are bearings $R^4$ and $R^5$, in which are journaled shafts $R^2$ and $R^3$, having on their inner ends the wheels R and R' and on their outer ends long tubular bearings $R^6$ and $R^7$. In each of these bearings are tubes or a tube having a slot, as at $S^4$, and a pin, $S^3$, which passes through the bearing, and within the tube are springs $S^5$ and $S^6$, which extend from the pin S³ to points S⁵ S⁶. These devices constitute the row-checkers, which will penetrate the ground sufficiently to make a plain mark, but, owing to their construction, should they come contact with a rock or hard lump of dirt, or any other obstacle, they can recede through the long tubular bearings R⁶ or R⁷ sufficiently to pass without injury. In this respect they act independently of each other and of the rest of the machinery. The row-checkers are secured on their respective shafts so as to be parallel with each other and mark the ground at the same time.

Having described the individual elements and the several groups of elements, I will now describe the mechanism by which they are geared together, driven, and caused to coact.

Returning to Fig. 1 of the drawings and to that part of the description which related to shafts 15 and Q and their adjuncts, wherein it was shown how from the large wheel B⁸ the shafts 15 and Q and the right and left hand sets of gear K L M L' and K' L⁶ L⁷ were caused to move, we find that from the sprocket-wheel M of shaft 15 a link-belt extends to wheel R on the shaft of the left-hand row-checker, and a similar link-belt extends from the sprocket-wheel L⁷ on the right of shaft 15 to the wheel R' on the end of the shaft of the right-hand row-checker. Consequently both row-checkers are simultaneously operated from the power-shaft 15.

In order to control the row-checkers independently of the gearing for automatically operating them, so as to be able to adjust the row-checkers in starting, stopping, and turning, the following devices are provided:

Immediately over the power-shaft 15 is secured a fixed shaft or rod, H⁵, (see Fig. 5,) supported by a bracket or standard, I, secured to frame-piece B³. On this shaft H⁵ is loosely journaled a hand-wheel, T, to the hub of which is secured a sprocket-wheel, T', also free to revolve on shaft H⁵, and over this sprocket-wheel T' passes a chain or link belt to the sprocket-wheel L' of shaft 15. The loose hand-wheel T and sprocket-wheel T' are prevented from moving endwise on shaft H⁵ by a collar, T², secured by a set-screw. It will be at once apparent that when the clutch G is disengaged and the left-hand set of gearing, K, L, M, and L', is free to move independently of the shaft 15, the driver can, by means of the hand-wheel T, sprocket-wheel T', link-belt and sprocket-wheel L, control said gearing, K L M, &c., and through it the row-checkers, so as to adjust them at pleasure. In doing so the hand-wheel is moved so as to bring the row-checker, on the side corresponding with the last row of checks, exactly in contact with the last check made in the row. The team is then started and guided so that one row-checker will come in contact with each check in that row as the team advances, thus forming a new row on the other side of the planter, to be used when returning. On this same fixed shaft H⁵ (see Fig. 5) is secured a collar, H', having two pins, H² and H³, which extend through slots H⁴, cut in the shipping-lever H, which controls the clutch G on the driving-shaft 15.

84 indicates the driver's seat, supported by curved arms 81 82 83, and within reach of this seat the shipping-lever H and hand-wheel T are placed.

In order to operate the cylinders of the feed-boxes 36, 39, and 40, two shafts, U and U', are journaled in supports U² U³, secured to the rear floating frame, which carries the driving-shaft 15. These shafts have on one end bevel-pinions P P', having each a full set of teeth, and which gear with the mutilated bevel-pinions K K' of the power-shaft 15, the opposite ends of said shafts having universal joints X X', by which they are connected with shafts U⁴ U⁵, and the latter are in turn connected by universal joints X² X³ with shafts U⁸ U⁹, the whole constituting a tumbler-shaft for communicating motion to the reciprocating-rods 26 27.

In order to provide for change of relation between the rigid frame A' A², &c., and the rear floating frame, B' B², &c., as well as the vertical rise and fall of frame C, the shafts U⁴ U⁵ are loosely connected to the universal joints X X', by a feather or spline, U⁶, and key-seat U⁷, (see Fig. 1,) so as to allow the end-play of shafts U⁴ U⁵ (which have bearings 19 19' on frame C) while they are still compelled to rotate with the boxes X X'.

On the ends of shafts U⁸ U⁹ are pinions 22 23, which mesh with racks 24 25, on the inner ends of slide-rods 26 and 27, so that power is transmitted from the power-shaft 15 to the slides 26 and 27, and as the bevel-pinions K and K' are mutilated, each having its teeth diametrically opposite to the other, the slides 26 and 27 are moved first in one direction and then the other.

The slide-rods 26 27 may be of wood, and rest in recesses of the braces 28 29 30 31 of frame C, which serve as guides.

The slide-rods 26 27 are connected together by pawl-rod 32 of the middle feed-box, 36, and to the opposite ends of said slide-rods are connected the pawl-rods 33 and 34 of the left and right hand feed-boxes, 39 40. Consequently the reciprocating motion of the slide-rods 26 27 are communicated to the pawl-rods 32 33 34 of the feed-boxes, and thence to the cylinders 66 67 and the regulator W of the several feed-boxes.

For the full construction and operation of the pawl-rods 32, 33, and 34 see previous description and Figs. 3 and 4 of drawings.

As the feed-boxes have a vertical movement independently of the frame C and of each other, and the pawl-rods must follow the boxes, a loose or adjustable connection of some kind between the slide-rods 26 27 and the pawl-rods 32 33 34 becomes necessary, and for this purpose I prefer to attach to the ends of the slide-rods 26 27 vertically-slotted stirrups or projecting castings 35, (see Figs. 1 and 4 and dotted lines, Fig. 2,) and provide the ends of the pawl-rods 32 33 34 with T-heads, so that when the pawl-rods are held at right angles to their normal position the T-heads can be entered in the slots of the casting 35, and when turned back to their normal position the pawls can rise and fall independently of the slide-rods 26 and 27 without becoming detached therefrom. The several pawls have their bearings in slots in the sides of the feed-boxes. (See Fig. 1.)

It will be noticed by reference to Fig. 2 that the center of the square bar $17^4$, to which the levers 17 17', which operate the frame C, is lower and a little in advance of the center of the universal joints X X', and this difference permits the shafts $U^4$ and $U^5$ to slide outward from the hubs of the joints when the feed-frame C is raised by the actuating-lever, and inward when the frame is lowered.

It will also be noted that the relation between the bevel-gears K K' of shaft 15 and the pinions 22 23 of tumbler-shafts $U^8$ $U^9$ should be such that the stroke of the slide-rods 26 and 27 shall be the same as the distance between the centers of the rows of holes in the feed-cylinders 66 and 67, (see Fig. 4,) in order that the feed may be regular.

The wheels and gears of the driving mechanism are all of substantially the same size, or proportioned so that the speeds are uniform, and the dropping of the grain will consequently coincide with the operation of the row-checker. From the nature of the connections of the driving-gear the bevel-gears P P', by means of which the slide-rods 26 27 are reciprocated, will turn in opposite directions.

The operation of the devices, briefly stated, will be as follows: The rotation of wheel $B^8$ causes the rotation of shaft 15 with it, and it, by means of clutch G, causes the left-hand connected series of bevel-gears and sprockets, K L M L', to move with the shaft 15. The sprocket L, by means of a link-belt, rotates shaft Q, which, by a second link-belt, drives the right-hand series of connected bevel and sprocket gearing, K' $L^6$ $L^7$, which latter turns on shaft 15. The two mutilated bevel-gears K K' drive the two tumbler-shafts $U^2$ $U^4$ $U^8$ and $U^3$ $U^7$ $U^9$ in opposite directions, and thus reciprocate the slides 26 27, and through pawl-rods 32 33 34 operate the cylinders of the feed-boxes. The seed as it falls is covered by the concave wheels 64 65 $B^8$. At the same time and at the same speed the sprocket-wheels M and $L^7$, by means of link-belts, drive the row-checkers.

By means of the lever $18^2$, shaft $17^4$, and pivoted levers 16, 16', 17, and 17' the feed-frame C is adjusted to give the desired depth of planting, while the independent vertical movement of the feed-boxes 36 39 40, permitted by the rods 44 45 46, (see Figs. 2 and 3,) boxes or eyes 41 42, &c., and the springs, allows each feed-box to adapt itself to the inequalities of the ground, and the rear pivoted or floating frame, B B' $B^2$, &c., allows the large driving-wheel to rise and fall on uneven ground independently of the axle-wheels, so as to relieve the axle, the frame, and the driving mechanism of severe twisting strains.

I am aware that the power or drive wheel has heretofore been journaled on a floating frame pivoted to the main frame, and do not herein broadly claim the same; but,

Having thus fully described the nature, operation, and advantages of my invention, what I claim, and desire to secure by Letters Patent, is—

1. In a corn-planter, the combination, with a rigid frame and tongue secured thereto, of a loose double-tree box or casting arranged to slide on the tongue, and chains and rods which connect said loose box with the rigid frame, substantially as and for the purposes specified.

2. In a three-row corn-planter, the combination, with the rigid frame A A' $A^2$ and tongue $A^3$, secured thereto, of the casting 8, having hook 8', and the draft-rods and chains 9 and 10, substantially as and for the purposes specified.

3. In a corn planter or seeder, the combination, with a rigid frame having its axle and wheels, of a floating frame pivoted on the rear of the main frame and having a power-wheel and power-shaft, clutch and pinion devices on the power-shaft of the floating frame, and tumbler-shafts for actuating the feed mechanism of the planter from the shaft of the floating frame, substantially as and for the purposes specified.

4. In a combined corn-planter and row-checker, the combination of a main frame having its axle and wheels, an adjustable feed-box frame, row-checkers and feed devices mounted thereon, a rear pivoted or floating frame having a driving-shaft and driving-wheel, and driving mechanism for actuating the row-checker and feed mechanism from the driving-shaft of the floating frame, substantially as and for the purposes specified.

5. The combination, with the main frame A A' $A^2$, &c., having its wheels 64 65, of three feed-boxes and the row-checkers carried by said frame, a pivoted or floating rear frame, B B' $B^2$, &c., having the driving-wheel $B^8$, driving-shaft 15, two sets of gears, K L M and K' $L^6$ $L^7$, and the link-belting and tumbler-shafts for actuating the feed mechanism and row-checkers from the driving-shaft 15 of the floating frame, substantially as and for the purposes specified.

6. In a corn-planter, the combination of a main rigid frame having its axle and wheels, a vertically-adjustable feed-box frame mounted thereon, a rear pivoted or floating frame having a driving-shaft and driving-wheel, and driving-gear for actuating the feeding mechanism from the driving-shaft of the floating frame, substantially as and for the purposes specified.

7. In a corn-planter or seeder, the combination, with a main frame, of an adjustable feed-box frame mounted thereon and a series of feed-boxes loosely mounted on the feed-box frame so as to have each its independent movement, substantially as and for the purposes specified.

8. In a corn-planter or seeder, the combination, with a main frame, of an adjustable feed-box frame mounted thereon, a series of feed-boxes loosely mounted on the feed-box frame so as to have each an independent movement, and row-checkers journaled on the adjustable feed-box frame, substantially as and for the purposes specified.

9. In a corn-planter or seeder, the combination of a main frame, a feed-box frame adjustably mounted thereon, a rear pivoted or floating frame having a driving shaft and wheel, and driving mechanism for actuating the feed mechanism, substantially as and for the purposes specified.

10. In a corn-planter or seeder, the combination of a main frame, an adjustable feed-box frame mounted thereon, a series of feed-boxes mounted on the feed-box frame so as to have each its independent movement, a pivoted or floating rear frame having a driving shaft and wheel, and gearing for actuating the feed devices from the driving-shaft of the rear floating frame, substantially as and for the purposes specified.

11. In a corn-planter or seeder, the combination of a main frame, an adjustable feed-box frame mounted thereon, row-checkers journaled on the adjustable feed-box frame, a series of feed-boxes loosely mounted on the feed-box frame so as to each have an independent movement, a rear pivoted or floating frame having a driving shaft and wheel, and driving-gear for actuating the feed mechanisms and the row-checkers from the driving-shaft of the rear floating frame, substantially as and for the purposes specified.

12. The combination, with the main frame $A\ A'\ A^2$, of the adjustable feed-box frame C, the levers 16 16' 17 17', rod $17^4$, and hand-lever $18^2$, substantially as and for the purposes specified.

13. The combination, with the main frame, of the adjustable feed-box frame, the levers 16 16' 17 17', and journals 18 18', the rear pivoted or floating frame, the driving-shaft 15, gear-wheels K K', and extensible tumbler-shafts having the universal joints X X' with spline and key-seat, the journal-boxes 18 18' being below and in advance of the universal joints X X', substantially as and for the purposes specified.

14. The combination, with the driving-shaft 15, its sprocket-wheels and link-belts, and the row-checkers actuated thereby, of the shaft $H^5$, the hand-wheel T, and sprocket-wheel T', and its link-belt, substantially as and for the purposes specified.

15. The combination, with a feed-box frame, a feed-box loosely mounted thereon so as to have a movement independent of the frame, a slide-rod moving on the feed-box frame, and a pawl-rod having bearings on the feed-box, of a loose connection between the slide-rod and the pawl-rod—such as the slotted casting 35—and the T-head of the pawl-rod, substantially as and for the purposes specified.

16. The combination, with feed-cylinders 66 67 and flirt-valve or regulator W, of a pawl-rod having reverse pawls for actuating the cylinders and pendent tappets or fingers for actuating the flirt or regulator valve, substantially as and for the purposes specified.

17. The combination, with a feed-box frame, of a feed-box loosely mounted on said frame, having eyes or boxes for the passage of rods, a series of rods, springs on said rods, which springs yieldingly support the feed-box, and a shoe attached to the lower ends of said rods, substantially as and for the purposes specified.

18. The combination, with a feed-box having a socket or recess on the under side of its spout or dropper and a shoe, of a knife pivoted on the shoe and having a tang or shank which extends up and enters the recess on the under side of the dropper, substantially as and for the purposes specified.

ROBERT IRONS SKILES.

Witnesses:
HOWARD S. BAILEY,
CHARLES EVANS SKILES.